Sept. 15, 1953  M. M. LEVY  2,652,490

THERMIONIC VALVE INTEGRATING CIRCUITS

Filed Nov. 15, 1950

INVENTOR
Maurice Moise Levy
BY
ATTORNEY

Patented Sept. 15, 1953

2,652,490

UNITED STATES PATENT OFFICE 2,652,490

THERMIONIC VALVE INTEGRATING CIRCUITS

Maurice Moise Levy, London, England, assignor to The General Electric Company Limited, London, England Application November 15, 1950, Serial No. 195,773
In Great Britain November 17, 1949

6 Claims. (Cl. 250—27)

This invention relates to thermionic valve integrating circuits, that is thermionic valve circuits adapted to provide an output voltage whose instantaneous rate of change with time is substantially proportional to the magnitude of a voltage or current applied to the input of the circuit.

One known form of thermionic valve integrating circuit comprises a valve having at least an anode, a cathode and a control grid, and having a condenser connected between its anode and control grid. In the initial condition of the circuit the condenser is charged up so that the anode of the valve is positive with respect to its control grid. The source of voltage or current to be integrated is connected between the control grid and cathode of the valve, and during the integrating period the condenser discharges through the anode-cathode path of the valve in such a manner that the anode potential decreases at a rate which is instantaneously proportional to the magnitude of the current flowing into the condenser. If it is desired to integrate an applied voltage, it is necessary to connect a resistance between the control grid of the valve and the positive terminal of the source of the voltage to be integrated, so that the current flowing into the condenser is proportional to this voltage. When it is desired to restore the circuit to its initial condition, it is necessary to recharge the condenser, and in certain applications of the circuit it is desirable that this should take place as rapidly as possible. This may be the case, for example, where the circuit is used to produce a linear time base, a constant voltage or current being integrated in this case.

It is an object of the present invention to provide a thermionic valve integrating circuit of the general kind described above, in which the restoration of the circuit to its initial condition may be made very rapid.

According to the present invention a thermionic valve integrating circuit comprises in combination a thermionic valve having at least a cathode, an electron-collecting electrode and a control grid, the source of voltage or current to be integrated being adapted to be connected between the control grid and cathode of the valve, a condenser connected between said electron-collecting electrode and control grid of the valve, a unidirectional conducting device having a first electrode connected to said electron-collecting electrode of the valve, said device being such that the permissible direction of conventional current flow through the device is towards the first electrode, means for normally preventing the flow of current through said device to the first electrode, and means for restoring the circuit to its initial condition after the integration of a voltage or current comprising means for applying to a second electrode of said device a voltage pulse which drives the second electrode positively with respect to the first electrode and causes current to flow through the device to the first electrode whereby the condenser is recharged so that said electron-collecting electrode of the valve becomes more positive with respect to its control grid.

Preferably the thermionic valve is a pentode, said electron-collecting electrode being the anode, and the means for restoring the circuit to its initial condition includes means for biasing the suppressor grid of the pentode so as to prevent the flow of anode current in the pentode while the condenser is being recharged.

The unidirectional conducting device may be a second thermionic valve having at least an anode, a cathode and a control grid, said first electrode being the cathode of the second valve and the anode of the second valve being connected to the positive terminal of a constant voltage source whose negative terminal is connected to the cathode of the first valve. In this case the said second electrode will be the control grid of the second valve, and the means for normally preventing the flow of current through the device will comprise means for normally biasing the control grid of the second valve so that no cathode current can flow in the second valve.

Alternatively the unidirectional conducting device may have only two electrodes, being for example a thermionic diode valve or a metal rectifier.

Two arrangements in accordance with the invention will now be described, by way of example, with reference to the accompanying drawings, in which.

Figure 1:
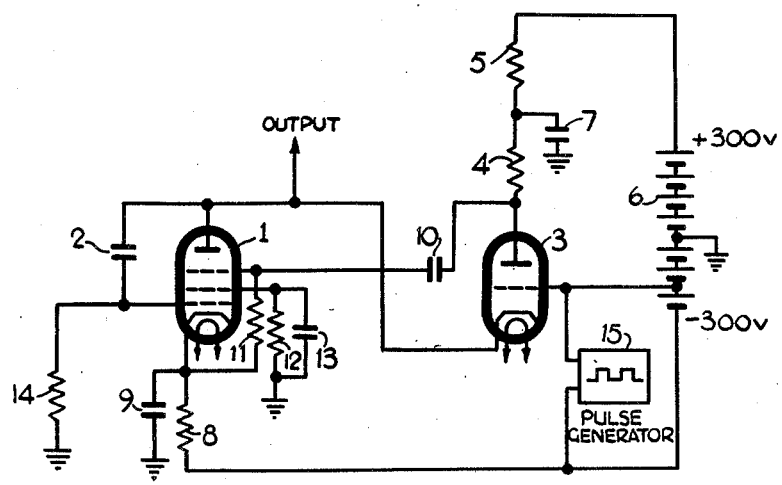
Figure 1 is a circuit diagram of a linear time base circuit.

Referring to Figure 1, the circuit shown therein is adapted to provide a linear time base which is negative going from approximately earth potential. The circuit includes a pentode valve 1 having a condenser 2 connected between its anode and control grid, and a triode valve 3. The cathode of the triode 3 is directly connected to the anode of the pentode 1, while the anode of the triode 3 is connected through a load resistance 4 and a decoupling resistance 5 to the positive terminal of a constant voltage source 6 the centre point of which is earthed, a bypass condenser 7 being connected between the junction of the resistances 4 and 5 and earth. The cathode of the pentode 1 is connected to the negative terminal of the source 6 through a resistance 8 which is bypassed by a condenser 9. The anode of the triode 3 is also connected through a condenser 10 to the suppressor grid of the pentode 1, which is connected through a resistance 11 to the cathode of the pentode 1, and the screen grid of the pentode 1 is connected to earth through a resistance 12 bypassed by a condenser 13. The control grid of the pentode 1 is connected through a high resistance 14 to earth. The grid of the triode 3 is connected to a point which is negative with respect to earth, and to this grid is connected a generator 15 of recurrent pulses, the recurrence frequency of the pulses being equal to the desired recurrence frequency of the time base. The output of the circuit is taken from the anode of the pentode 1.

In the initial condition of the circuit the condenser 2 is charged up so that the anode of the pentode 1 is approximately at earth potential, while the control grid of the pentode 1 is at a potential corresponding to anode current cut-off.

During the integrating period, which commences immediately the circuit is set in its initial condition, current flows into the condenser 2 through the resistance 14, and the condenser 2 discharges through the anode-cathode path of the pentode 1. The anode potential of the pentode 1 decreases substantially linearly with time at a rate proportional to the current flowing into the condenser 2, which is substantially constant. The bias on the grid of the triode 3 is sufficiently negative to prevent the flow of cathode current in the triode during the linear sweep of the time base, that is the bias is more negative than the lowest value to which the anode potential of the pentode 1 falls.

The linear sweep is ended and the circuit is restored to its initial condition to begin the next sweep by the application of a pulse from the generator 15 to the grid of the triode 1. The pulse applied to the grid is highly positive, having an amplitude of 300 volts in the circuit shown in Figure 1. The application of the pulse causes cathode current to flow in the triode 3 and the cathode potential follows the grid potential and drives the anode of the pentode 1 back to earth potential. This drive may be made very strong since a large cathode current can be obtained from the triode 3 when it is pulsed. For example a triode giving normally 10 milliamps. continuous cathode current may be pulsed to give 100–1,000 milliamps. for short time intervals. The time constant of the charging of the condenser 2 may therefore be made considerably shorter than is the case with known integrating circuits of the kind described above, where the condenser is normally recharged from a constant voltage source through a comparatively high resistance.

When the anode of the pentode 1 is driven positive upon restoration of the circuit to its initial condition, the control grid potential of the pentode 1 tends to follow the anode potential since the condenser 2 cannot charge instantaneously, and in the absence of preventive means anode current might flow in the pentode 1 and reduce the rapidity of restoration. In order to prevent this the condenser 10 is connected between the anode of the triode 3 and the suppressor grid of the pentode 1 as previously described, so that the negative pulse which is developed at the anode of the triode 3 when the positive pulse is applied to its grid is applied through the condenser 10 to the suppressor grid of the pentode 1 to prevent the flow of anode current in the pentode 1.

Figure 2:
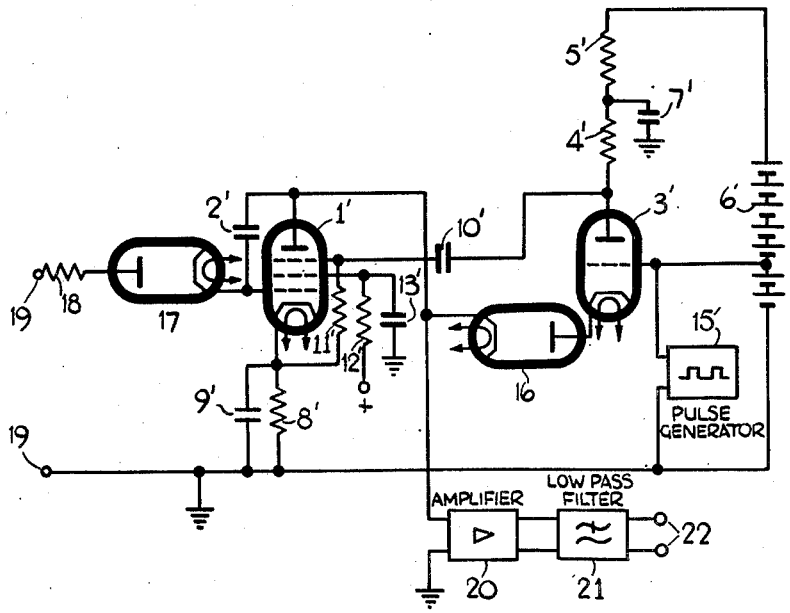
Figure 2 is a circuit diagram of part of a demodulator for an electric pulse amplitude or width modulation communication system.

Referring now to Figure 2, the integrating circuit shown therein is basically similar to that shown in Figure 1, and corresponding elements in the two figures are denoted by corresponding reference numerals. The circuit shown in Figure 2 includes a pentode valve 1' having a condenser 2' connected between its anode and control grid, and a triode valve 3'. The cathode of the triode 3' is connected to the anode of a diode valve 16 whose cathode is connected to the anode of the pentode 1', while the anode of the triode 3' is connected through a load resistance 4' and a decoupling resistance 5' to the positive terminal of a constant voltage source 6' the negative terminal of which is earthed, a bypass condenser 7' being connected between the junction of the resistances 4' and 5' and earth. The cathode of the pentode 1' is connected to the negative terminal of the source 6' through a resistance 8' which is bypassed by a condenser 9'. The anode of the triode 3' is also connected through a condenser 10' to the suppressor grid of the pentode 1' which is connected through a resistance 11' to the cathode of the pentode 1', and the screen grid of the pentode 1' is connected through a resistance 12' to a point which is intermediate in potential between the positive and negative terminals of the source 6', a bypass condenser 13' being connected between the screen grid and earth. To the control grid of the pentode 1' is connected the cathode of a diode valve 17 whose anode is connected to one end of a resistance 18. The other end of the resistance 18 is connected to the positive one of the terminals 19 of the source of the pulse train which is to be demodulated. The diode 17 serves to prevent voltages being applied to the control grid of the pentode 1' which would make this grid more negative with respect to the cathode of the pentode 1'. The grid of the triode 3' is connected to a point which is intermediate in potential between the terminals of the source 6', and to this grid is connected a generator 15' of recurrent pulses, the recurrence frequency of the pulses being equal to that of the pulses applied to the control grid of the pentode 1'.

In the initial condition of the circuit the condenser 2' is charged up so that the anode of the pentode 1' is at a potential positive with respect to earth, while the control grid of the pentode 1' is at a potential corresponding to anode current cut-off.

On the application of a pulse to the input of the circuit the control grid potential of the pentode 1' increases to allow anode current to flow in the pentode 1', and the condenser 2' discharges through the anode-cathode path of the pentode 1'. The anode potential of the pentode 1' decreases substantially linearly with time, until the end of the pulse, at a rate proportional to the amplitude of the pulse, since the current flowing into the condenser 2' is proportional to the amplitude of the pulse. The bias on the grid of the triode 3' is made such as to prevent the flow of cathode current in the triode 3' during the period of the pulse, whatever may be the value to which the anode potential of the pentode 1' falls. At the end of the pulse the anode potential of the pentode 1' remains at a steady value dependent upon the initial value of the anode potential, its rate of fall during the integrating period, and the length of the pulse.

The circuit is restored to its initial condition shortly before the next pulse is applied to the input of the circuit. This is done by applying a highly positive voltage pulse from the generator 15' to the grid of the triode 3'. This causes cathode current to flow in the triode 3' and the cathode potential follows the grid potential and drives the anode of the pentode 1' to the required positive potential. It is undesirable that fluctuations of the grid potential of the triode 3' having an amplitude small compared with that of the restoring pulses and occurring between successive restoring pulses should be fed to the anode of the pentode 1' through the grid cathode capacity of the triode 3', and in order to prevent this the diode 16 is connected between the cathode of the triode 3' and the anode of the pentode 1'. The condenser 10' is connected between the anode of the triode 3' and the suppressor grid of the pentode 1' in similar manner to the condenser 10 in Figure 1, in order to prevent the flow of anode current in the pentode 1' which would reduce the rapidity of restoration.

It will be seen that if the anode potential of the pentode 1' is restored to the same initial value before each integration, then after the application of a pulse to the circuit, the anode potential of the pentode 1' will differ from the initial value by an amount directly proportional to both the amplitude and width of the pulse. Thus if a train of pulses of constant width but modulated in amplitude is applied to the input of the circuit the value of the anode potential of the pentode 1' after the application of a pulse will depend only on the amplitude of the pulse, and therefore on the modulation. Similarly if a train of pulses of constant amplitude but modulated in width is applied to the input of the circuit the value of the anode potential of the pentode 1' after the application of a pulse will depend only on the width of the pulse, and therefore on the modulation.

In either case the output from the anode of the pentode 1' is fed via an amplifier 20 to a low-pass filter 21, the demodulated signal appearing at the output terminals 22.

The circuit shown in Figure 2 may be used in a multichannel time division pulse communication system. One such circuit is provided for each channel, the received pulses being gated so that only pulses of one channel are applied to each circuit. If the gating is carried out by application of recurrent pulses, the generator 15' may be conveniently be synchronised with the generator of the gating pulses for the immediately preceding channel, to ensure that the circuit is restored to its initial condition at the correct time.

I claim:

1. A thermionic valve integrating circuit comprising: a thermionic valve having at least a cathode, an electron-collecting electrode and a control grid; means for connecting a source of current to be integrated between said control grid and cathode; a condenser connected between said electron-collecting electrode and control grid; a unidirectional conducting device having at least a pair of electrodes, means connecting a first one of said pair of electrodes to said electron-collecting electrode, the permissible direction of conventional current flow through said device being towards said first one of said pair of electrodes, the voltage applied to the second one of said pair of electrodes controlling the flow of current through said device to the first one of said pair of electrodes; means for biasing said second one of said pair of electrodes so as normally to prevent the flow of current through said device to the first one of said pair of electrodes; a generator of voltage pulses; and means for applying a pulse derived from said generator to said second one of said pair of electrodes in a positive sense when it is desired to restore the circuit to its initial condition, the pulse being of sufficient magnitude to cause a pulse of current to flow through the device to said first one of said pair of electrodes.

2. A thermionic valve integrating circuit according to claim 1, in which the thermionic valve is a pentode having a suppressor grid, the electron-collecting electrode being the anode, and the circuit including means for applying a pulse derived from said generator in a negative sense to said suppressor grid simultaneously with the application of a pulse to the second one of the pair of electrodes, the pulse applied to the suppressor grid being of sufficient magnitude to prevent the flow of anode current in the pentode.

3. A thermionic valve integrating circuit according to claim 1, in which the unidirectional conducting device is a second thermionic valve having at least an anode, a cathode and a control grid, the first and second electrodes of the pair of electrodes being respectively the cathode and control grid of the second valve.

4. A thermionic valve integrating circuit according to claim 1 in which the unidirectional conducting device is a thermionic diode valve, said first and second electrodes of the pair of electrodes being respectively the cathode and anode of the diode.

5. A linear time base circuit comprising: a thermionic valve having at least a cathode, an electron-collecting electrode and a control grid; a condenser connected between said electron-collecting electrode and control grid; a constant voltage source having its negative terminal connected to said cathode; a high resistance connected between the positive terminal of said source and said control grid; a unidirectional conducting device having at least a pair of electrodes, means connecting a first one of said pair of electrodes to said electron-collecting electrode, the permissible direction of conventional current flow through said device being towards said first one of said pair of electrodes, the voltage applied to the second one of said pair of electrodes controlling the flow of current through said device to said first one of said pair of electrodes; means for biasing said second one of said pair of electrodes so as normally to prevent the flow of current through said device to the first one of said pair of electrodes; a generator of regularly recurrent voltage pulses; and means for applying said pulses in a positive sense to said second one of said pair of electrodes, said pulses being of sufficient magnitude to cause pulses of current to flow through the device to said first one of said pair of electrodes.

6. A demodulator for an electric pulse amplitude or width modulation communication system comprising; a thermionic valve having at least a cathode, an electron-collecting electrode and a control grid; a condenser connected between said electron-collecting electrode and control grid; a resistance connected at one end to said control grid; means for applying a train of pulses to be demodulated between the other end of said resistance and said cathode; a unidirectional conducting device having at least a pair of electrodes, means connecting a first one of said pair of electrodes to said electron-collecting electrode, the permissible direction of conventional current flow through said device being towards the first one of said pair of electrodes, the voltage applied to the second one of said pair of electrodes controlling the flow of current through said device to the first one of said pair of electrodes; means for biasing said second one of said pair of electrodes so as normally to prevent the flow of current through said device to the first one of said pair of electrodes; a generator of voltage pulses each of which occurs at a time before the application of one pulse of said train which is short compared with the interval between successive pulses of said train; means for applying said voltage pulses in a positive sense to said second one of said pair of electrodes, said voltage pulses being of sufficient magnitude to cause pulses of current to flow through the device to said first one of said pair of electrodes; a low-pass filter; means connecting said electron-collecting electrode to the input of the low-pass filter; and means for deriving a demodulated signal as an output from the filter.

MAURICE MOISE LEVY.

References Cited in the file of this patent

UNITED STATES PATENTS

| Number | Name | Date |
|---|---|---|
| 2,500,536 | Goldberg | Mar. 14, 1950 |